R. W. DULL.
PAN CONVEYER LINK BELT CONSTRUCTION.
APPLICATION FILED MAR. 29, 1917.
1,411,993.
Patented Apr. 4, 1922.
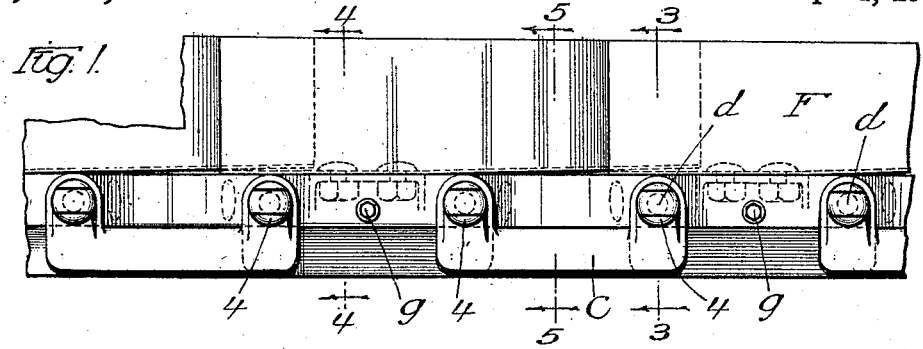
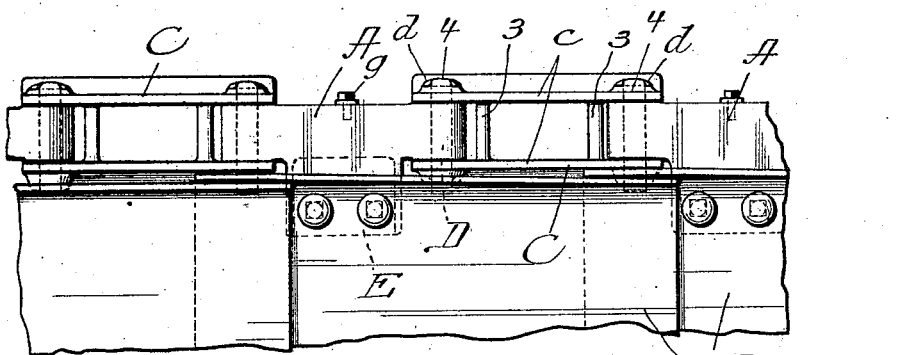
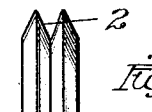
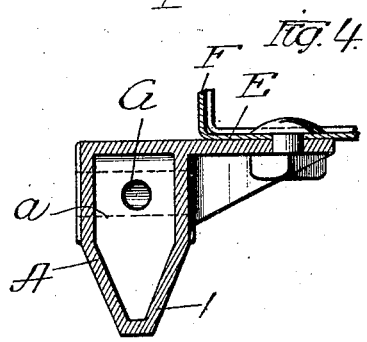
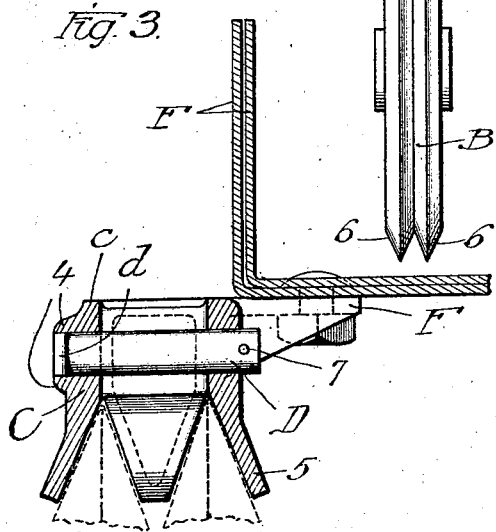
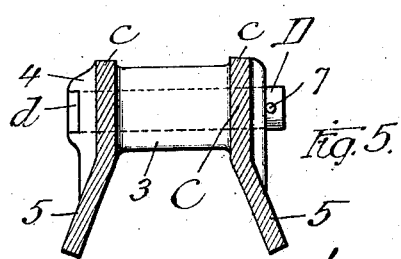

UNITED STATES PATENT OFFICE.

RAYMOND W. DULL, OF LA GRANGE, ILLINOIS.

PAN-CONVEYER LINK-BELT CONSTRUCTION.

1,411,993.  Specification of Letters Patent.  Patented Apr. 4, 1922.

Application filed March 29, 1917. Serial No. 158,162.

*To all whom it may concern:*

Be it known that I, RAYMOND W. DULL, a citizen of the United States of America, and resident of La Grange, Cook County, Illinois, have invented a certain new and useful Improvement in Pan-Conveyer Link-Belt Constructions, of which the following is a specification.

My invention relates to link-belts in general, but more particularly to those which are used in connection with pan-conveyers, such, for example, as those in which overlapping pans are mounted on parallel link-belts to form a practically continuous trough for the materials.

The object of my invention is to provide an improved construction and arrangement which will prevent or tend to prevent undue wear in the pivot-bearings between the links of the belt.

Another object is to provide an improved construction and arrangement whereby the links of a belt of this kind can each be cast in one integral piece.

A further object is to provide an improved construction and arrangement whereby a link-belt of this kind is self-lubricating in character, being provided with means for supplying a lubricant to the pivot-bearings between the links.

It is also an object to provide certain details and features of construction and combinations tending to increase the general efficiency and serviceability of a link-belt for this particular purpose.

To these and other useful ends, my invention consists in matters hereinafter set forth and claimed.

In the accompanying drawings:—

Fig. 1 is a side elevation of a portion of a pan-conveyer having a link-belt embodying the principles of my invention.

Fig. 2 is a plan of one side portion of said pan-conveyer.

Fig. 3 is an enlarged cross-section on line 3—3 in Fig. 1.

Fig. 4 is an enlarged cross-section on line 4—4 in Fig. 1.

Fig. 5 is an enlarged cross-section on line 5—5 in Fig. 1.

Fig. 6 is an edge view, on a smaller scale, of one of the pulleys or wheels upon which the link-belt is supported.

As thus illustrated, my invention comprises alternate links A which are each cast in one integral piece, each link being hollow to provide a chamber $a$, and the lower portion of each link being tapered in cross-section to provide a wedge-shaped engaging portion 1, so that these links may engage the V-shaped channel 2 in the wheel B, which latter may be mounted in any suitable manner. The intermediate links C are also each cast in one integral piece, but are each composed of parallel side portions $c$ spaced apart and connected together by integral transverse portions 3, so that each of these links is shaped to embrace the ends of the adjacent alternate links. Transverse pins D are inserted through the ends of the links, to pivotally connect the links together, and the intermediate links C have their outer sides provided with lugs 4 to engage the heads $d$ of the pins, thereby to prevent these pins from turning in the intermediate links. Each intermediate link C is provided with integral portions 5, which flare apart when the link is viewed in cross-section, and which combine with the wedge-shaped portions 1 of the outlet links to form two V-shaped channels on the under side of the belt. As the links overlap, so that the portions 5 extend to and beyond the ends of the wedge-shaped portions 1, it follows that these V-shaped channels have a practically continuous engagement with the wedge-shaped portions 6 of the wheel, notwithstanding the fact that each channel has its sides formed with gaps therein. In other words, the engaging side portions for each channel are staggered, so to speak, so that the gaps in one side of each channel are opposite the engaging portions of the other side of the same channel, and the engaging portions are longer than the gaps, whereby the frictional engagement of the belt with the wheel is practically unbroken and continuous. At their inner ends, the pins D may be provided with retaining devices 7, of any suitable character, to keep the pins from being displaced endwise from the belt.

Each link-belt A is provided on its inner side with a lateral projection E, in the nature of a bracket, and the pans F, which are simply short sections of a trough, with their ends telescoped one within the other, are each secured at one end thereof to a pair of these brackets on the two parallel belts. Thus the pans overlap, one upon the other, like shingles, and are free to separate or disengage each other when they travel around the wheel. While the pans and belts are traveling along a straight horizontal stretch, however, the pans engage each other, forming a practically continuous trough, so that the materials therein are conveyed from one place to another. With this construction, it will be seen, the pan-conveyer can be run at high speed, thus increasing the efficiency thereof, inasmuch as the belts have a smooth or frictional engagement with the supporting wheels and no sprocket teeth are necessary. With the ordinary sprocket-chain, requiring teeth on the sprocket-wheels, a limitation would be imposed upon the speed of the conveyer, and high speed would be impracticable if not impossible; but with the construction shown and described the pan-conveyer can run at high speed, without danger of breakage or injury to the apparatus, and so smoothly that such freedom from jarring with the materials in the conveyer do not jump up and down, and are not liable to be thrown from the conveyer while the latter is traveling at high speed.

The chambers $a$, it will be seen, in the alternate links, are provided at their opposite ends with holes G which communicate with the pins D, so that the lubricant carried in said chambers is supplied to the bearings of the pins in the links. Removable screw-plugs $g$ are provided in the outer sides of the links A for introduction of the lubricant into the chambers $a$, and in this way the belt is self-lubricating in character. The pins D, it will be seen, have a greater bearing in the links A than in the links C, so that the pins are not as liable to be worn or cut by the friction of the links thereon. In other words, the pins D only turn in the links A, and as these links have an extensive engagement with the pins, providing ample bearing surface, it follows that undue wear on the pivotal bearings between the links is not as likely to occur and is practically precluded by the construction shown and described. The lubrication of these bearings in the links A helps, of course, to prevent undue wear between the links and the pins.

What I claim as my invention is:—

1. In a pan-conveyer, a link belt therefor comprising a series of alternate links, a series of intermediate links formed to embrace the ends of the alternate links, pins inserted through all of said links to turn in the alternate links, and means to prevent the pins from turning in the intermediate links, said pins having a greater bearing in said alternate links than in said other links, said alternate links being wedge-shaped in cross-section, and said intermediate links being channel-shaped in cross-section, so that when viewed in cross-section the belt has two wedge-shaped grooves, and a wheel having peripheral portions to frictionally engage said grooves.

2. A link-belt comprising wedge shaped links, and open links alternating with the wedge shaped links, pins to connect the links together, said wedge shaped links having means to feed a lubricant to the bearings for said pins.

3. A link-belt comprising alternate and intermediate links, and pins to connect said links together, said links being each formed in one integral piece, with each intermediate link shaped to embrace the end of an alternate link, and said links being formed to provide the belt with a channel to frictionally engage the periphery of a wheel.

Signed by me at Chicago, Illinois, this 22nd day of March, 1917.

RAYMOND W. DULL.